United States Patent [19]

Meyer

[11] 4,384,726
[45] May 24, 1983

[54] EXPANDABLE LUBRICATING PACKING ASSEMBLY FOR WELLHEADS

[75] Inventor: Danny S. Meyer, Richmond, Tex.

[73] Assignee: ACF Industries, Incorporated, New York, N.Y.

[21] Appl. No.: 317,705

[22] Filed: Nov. 2, 1981

[51] Int. Cl.³ .......................... F16J 15/18; F16J 15/46
[52] U.S. Cl. ................................ 277/59; 277/72 FM; 277/75; 277/112; 277/115; 277/117; 277/188 A; 277/DIG. 6; 277/27
[58] Field of Search ............... 277/59, 71, 72 R, 27, 277/72 FM, 75, 76, 79, 112, 116, 115, 116.2, 117–122, 124, 125, 188 R, 188 A, 190, DIG. 6; 166/116, 124, 182

[56] References Cited

U.S. PATENT DOCUMENTS

| | | | |
|---|---|---|---|
| 1,928,259 | 9/1933 | McCabe | 277/112 X |
| 2,456,081 | 12/1948 | Penick | 277/112 X |
| 2,831,325 | 4/1958 | White | 277/59 X |
| 3,279,805 | 10/1966 | Quinson | 277/188 A X |
| 3,362,345 | 1/1968 | Sparger | 277/72 X |
| 3,492,009 | 1/1970 | Beresnev et al. | 277/112 |
| 3,907,307 | 9/1975 | Maurer et al. | 277/71 X |
| 4,116,451 | 9/1978 | Nixon et al. | 277/124 X |

Primary Examiner—Robert S. Ward, Jr.
Attorney, Agent, or Firm—Marvin J. Marnock

[57] ABSTRACT

A packing assembly (10) for sealing the annulus between concentric tubular members (12, 14). The assembly (10) includes upper and lower sealing ring assemblies (31, 32) on each side of a lantern ring (33), and upper and lower retainer rings (36, 35) located atop and below the sealing ring assemblies and bolted together to maintain the rings in stacked concentric relation. Each sealing ring assembly (31, 32) includes a central lubricating packing ring (34) having inner and outer lubricating surfaces of graphite material; an inner pair of upper and lower metal seal rings (69, 70) seated in annular grooves in the central lubricating packing ring (34); and an outer pair of upper and lower metal seal rings (83, 84) located in annular grooves in the outer periphery of the lubricating packing ring (34). The metal seal rings and the packing ring are each provided with cooperative camming surfaces (72 and 41; 76 and 46; 85 and 61; 88 and 66) which interact when an axial compressive force is applied to the assembly (10) to thereby effect a controlled radial expansion of the sealing ring assemblies (31, 32) and establishing metal-to-metal seals (81, 82) and a lubricating packing seal with the annulus walls (11, 13). The axial compressive force is mechanically applied by the camming action of holddown screws (100) with a camming surface (102) on the upper retainer ring (36) and the outer tubular member is provided with an aperture (110) to permit injection of lubricant into the lantern ring for energizing the seals in emergency situations.

11 Claims, 6 Drawing Figures

EXPANDABLE LUBRICATING PACKING ASSEMBLY FOR WELLHEADS

BACKGROUND OF THE INVENTION

The invention relates to a packing assembly for sealing the annulus between the inside wall of a hollow cylindrical member and the outside wall of a second cylindrical member disposed therein and more particularly, it relates to a packing assembly for sealing the annulus between the inside wall of a wellhead and the outside wall of a casing or tubing hanger which is supported therein.

Heretofore, a great variety of packing assemblies have been used for sealing in wellheads and these generally employ elastomeric materials in the sealing elements. Such packing assemblies are susceptible to destruction by fire and at elevated temperatures short of fire conditions tend to deteriorate to such degree that their sealing capabilities are seriously impaired. Metal packing rings, on the other hand, have the advantage of holding up well under high pressure and temperatures but do not seal effectively where the coacting sealing surface has been galled or otherwise damaged.

Accordingly, it is a general object of the invention to provide an improved packing assembly for sealing an annulus as in a wellhead assembly, which is effective for sealing under high pressure and high temperature conditions and wherein the packing assembly can be mechanically activated.

Another object is to provide a packing assembly for sealing an annulus which includes the combination of metal-to-metal seals and lubricating packing seals and which can be reinforced in emergency conditions by the injection of a sealing plastic or fluid.

A further object is to provide a packing assembly which provides the combination of metal-to-metal seals and lubricating packing seals and which can be mechanically activated by the application of a carefully controlled axial compression force.

A still further object is to provide a packing assembly with both metal seal rings and lubricating packing rings which can be mechanically activated by the application of an axial compressive force to achieve a controlled radial expansion of the metal and lubricating packing seal rings.

SUMMARY OF THE INVENTION

The invention is directed to a packing assembly for sealing an annulus between cylindrical surfaces of cylindrical members in concentric relationship as between a casing hanger and casing head. The assembly includes upper and lower sealing ring assemblies disposed on each side of a lantern ring in stacked concentric relation. A pair of retainer rings, one atop and one below the respective sealing ring assemblies, are bolted together to maintain the ring assemblies in their stacked concentric relation. Each sealing ring assembly includes a lubricating packing ring and inner and outer pairs of metal seal rings which are nested in inner and outer pairs of annular grooves in the packing ring. The metal seal rings are provided with camming surfaces adapted to interact with camming surfaces on the packing ring to effect a radial expansion of the rings when an axial compressive force is applied to the packing assembly thereby effecting metal-to-metal seals and a lubricating packing seal with the concentric surfaces defining the annulus. The axial compression force for loading the packing assembly is achieved by mechanical means, such as holddown screws which extend through the outer cylindrical member and are used to cam the upper retainer ring downwardly against a shoulder of one of the cylindrical members and thereby compress the packing assembly. In addition, an aperture is provided through the wall of the outer cylindrical member adjacent the lantern ring whereby in the event of seal failure injectible sealing fluid may be injected into the annulus through the lantern ring to reinforce the seals. In a modification of the invention, instead of a single lubricating packing ring a pair of lubricating packing rings are disposed on the respective inner and outer surfaces of a metal camming ring which is provided with camming surfaces for interacting with the camming surfaces of the metal seal rings when an axial load is applied to activate the packing assembly.

BRIEF DESCRIPTION OF THE DRAWINGS

In the accompanying drawings, which form a part of the specification and are to be read in conjunction therewith.

Figure 1:
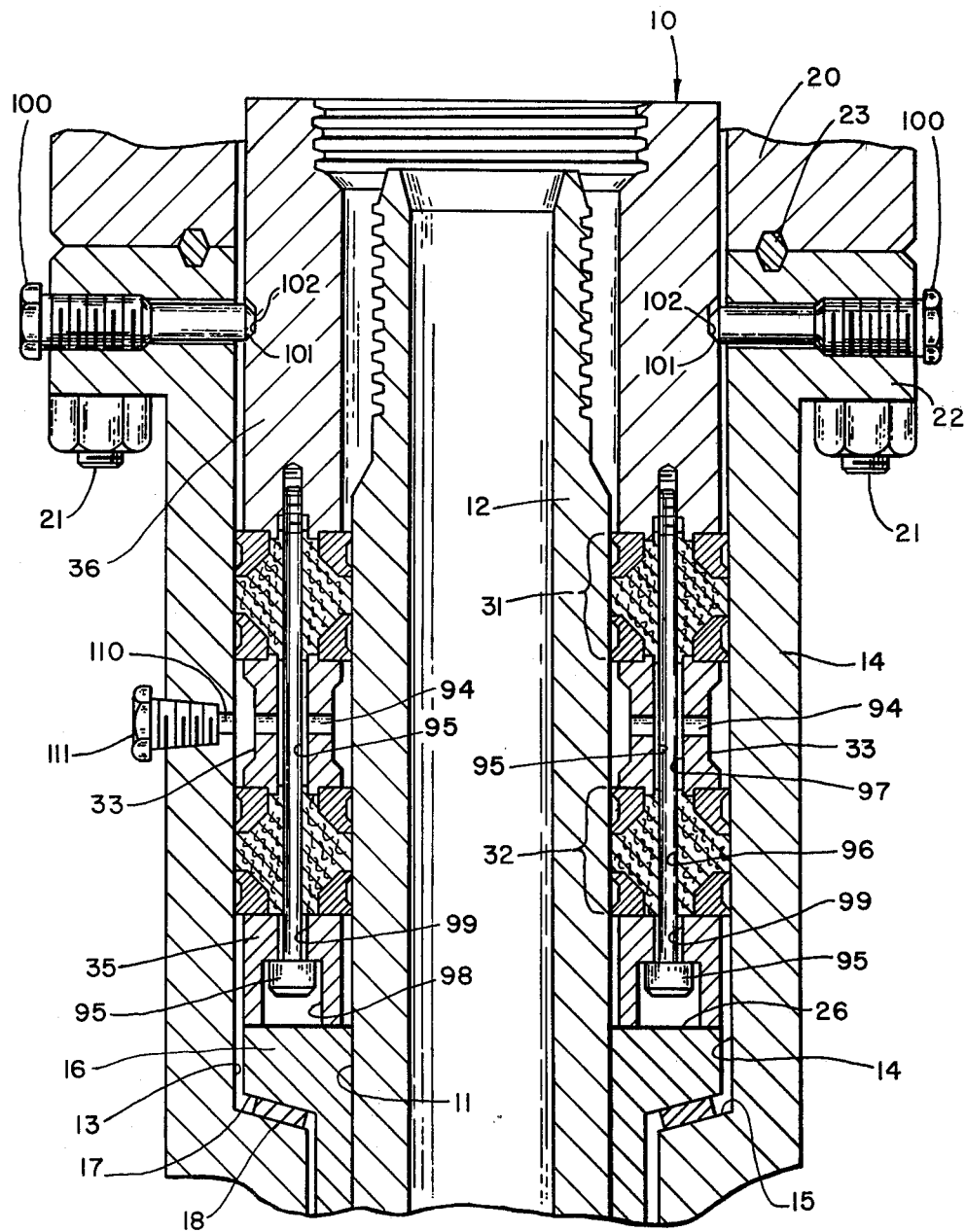
FIG. 1 is an elevational view, partly in section, of a wellhead assembly in which the packing assembly of this invention is shown installed in a wellhead to seal the annulus between a casing hanger and a casing head.

Referring more particularly to the drawings, a packing assembly 10 representing a preferred embodiment of the invention is shown installed in a wellhead for sealing the annulus between the outside wall 11 of a casing hanger 12 and the inside wall 13 of a casing head 14. The casing head 14 is provided with an internal upward facing annular shoulder 15 formed by a reduced diameter portion of the casing head bore. The shoulder 15 supports the casing hanger 12, which is provided with an annular flange 16, the underside of which forms a downward facing shoulder 17 for seating against a metallic seal ring 18 positioned on the shoulder 15. The metallic seal ring 18 may be formed of stainless steel or a material having similar properties and may be slightly deformed by the weight of the casing suspended from the hanger 12 to thereby form a tight metal-to-metal seal between the shoulders 15 and 17.

Atop the casing head 14 is installed another wellhead component such as a tubing head 20 which is secured to the casing head by bolts or studs 21 extending upwards through an annular flange 22 provided at the top of the casing head. An annular seal 23 located in accommodating annular grooves formed in the top of the casing head and the bottom of the tubing head seals the junction therebetween.

The packing assembly 10 is seated on a horizontal shoulder 26 provided by the upper annular face of the casing hanger flange 16 and, when an axial load is applied thereto, seals between the cylindrical walls 13 and 11 of the casing head and casing hanger respectively. The packing assembly 10 comprises upper and lower sealing ring assemblies 31 and 32 separated by a lantern ring 33. It also includes a lower retainer ring 35 and an upper retainer or adapter ring 36.

Figure 2:
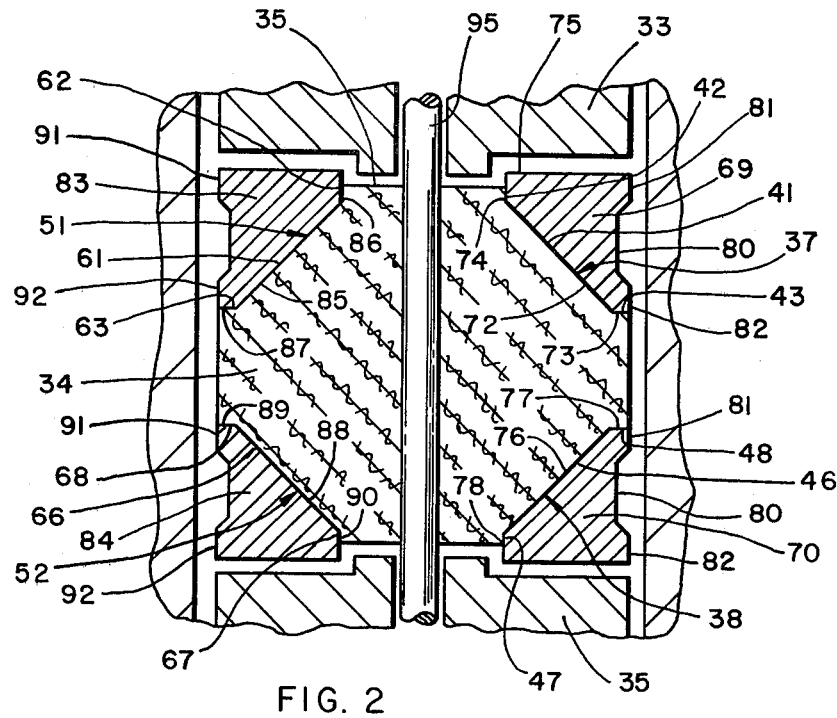
FIG. 2 is a fragmentary sectional view of the lower sealing ring assembly which is a part of the packing assembly of the invention with the sealing ring assembly being shown in its unloaded state.
Figure 3:
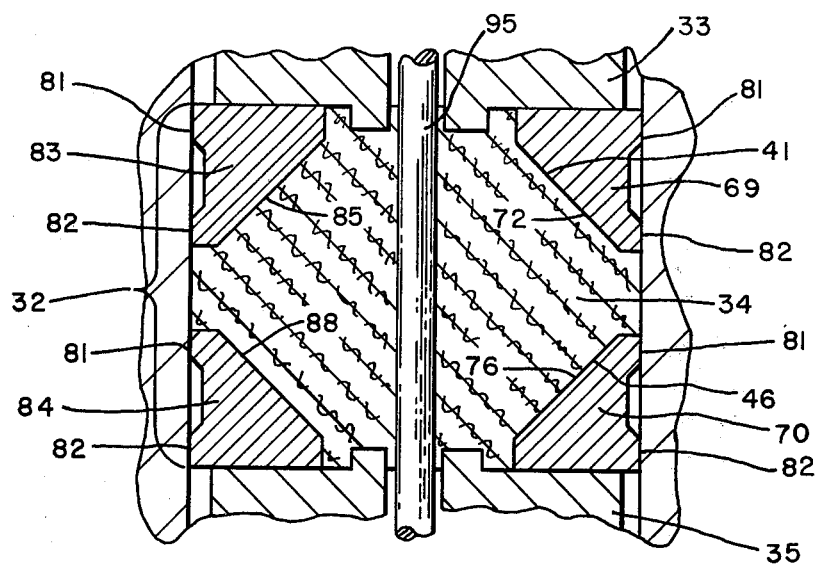
FIG. 3 is a view similar to FIG. 2 but showing the condition of the sealing ring assembly of FIG. 2 after an axial load has been applied thereto.

Details of a preferred embodiment of the packing assembly 10 are shown in FIGS. 2 and 3 which illustrate sealing elements of the lower sealing ring assembly 32 when in the unloaded and loaded states, respectively. The sealing ring assembly 32 comprises a central lubricating packing ring 34 which is fabricated from a high temperature resistant and lubricating material such as graphite. One such product which satisfies the requirements for the lubricating packing ring 34 is "Grafoil" which has the unique combination of high temperature stability, resiliency and lubricity. For its application herein as a packing material for sealing under high pressure it is necessary to use a very high density "Grafoil" which can be formed by compaction.

The lubricating packing ring 34 is provided with upper and lower annular grooves 37 and 38, respectively, in its inner peripheral surface. The groove 37 is defined by a central bottom surface 41 and vertical and horizontal sides 42, 43, respectively. The groove bottom 41 is of frusto-conical configuration and serves as a camming surface for purposes hereinafter described. The lower annular groove 38 is formed with a similar configuration, comprising a central frusto-conical camming surface 46 and vertical and horizontal sides 47, 48, respectively.

The lubricating packing ring 34 is also provided on its outer peripheral surface with upper and lower annular grooves 51, 52 of cross-sectional configuration similar to the grooves 38 and 37, respectively. However, in the outer grooves 51 and 52, the central frusto-conical camming surfaces face outwardly of the packing assembly 10. The groove 51 comprises a central camming surface 61 and vertical and horizontal sides 62, 63. The groove 52 comprises a central camming surface 66 and vertical and horizontal sides 67, 68.

Seated within the inner annular grooves 37 and 38 of the lubricating packing ring 34 are a pair of metal seal rings 69 and 70, respectively. The metal ring 69 is provided with an outer frusto-conical camming surface 72 of corresponding configuration with the camming surface 41 of the lubricating ring 34 against which it is seated. The metal ring is also formed with a lower annular surface 73 which is of like configuration with the horizontal groove side 43 against which it is seated. It is also provided with a vertical inner peripheral surface 74 which engages the vertical side 42 of the groove 37. As shown in FIG. 2, the vertical side 74 of the metal ring 69 is of greater height than the vertical side 42 of the "Grafoil" ring 36 so that the top surface 75 of the metal ring is slightly higher than the top surface 35 of the "Grafoil" ring 34.

The lower inner metal seal ring 70 is of corresponding configuration to the groove 38 being provided with an outer frusto-conical camming surface 76, an annular top surface 77, and an outer vertical surface 78 which seat respectively against the camming surface 46 and walls 48 and 47 of the "Grafoil" ring 34.

Each of the metal seal rings 69 and 70 is formed with an annular groove 80 in its interior peripheral surface which forms upper and lower annular lands 81, 82. The lands 81, 82 provide sealing surfaces for sealing against the outer cylindrical surface of the casing hanger 12.

The sealing ring assembly 32 also includes a pair of outer metal seal rings 83, 84 which are seated in the outer annular grooves 51 and 52, respectively, of the "Grafoil" ring 34. The upper metal seal ring 83 is provided with an inner frusto-conical camming surface 85, a vertical annular surface 86, and a bottom surface 87 which engage respectively the camming surface 61, and walls 62 and 63 of the upper outer groove 51 of the "Grafoil" ring 34.

The lower metal seal ring 84 seats in the lower outer groove 52 of the "Grafoil" ring 34 and is similarly configured. The metal seal ring 84 is provided with an inner frusto-conical camming surface 88, a top surface 89, and an inner annular surface 90 which engage the respective surfaces 66, 68 and 67 of the groove 52. As seen in FIG. 2, the height of the vertical walls 90 and 78 of the lower metal seal rings 70 and 84 is greater than the vertical side walls 67 and 47 of the grooves 52 and 38, respectively, so that the bottom surfaces of the metal rings 70 and 84 extend below the bottom of the "Grafoil" ring 34. The outer metal seal rings 83, 84 are also grooved in their outer peripheral surfaces to form upper and lower lands 91, 92, respectively, similar to the lands 81 and 82 which are formed in the inner peripheral surfaces of the inner metal seal rings 69 and 70. The lands 91, 92 provide sealing surfaces for sealing against the inner cylindrical wall of the casing head 14.

As shown in FIG. 1, the sealing ring assembly 32 rests on the lower metal retainer ring 35 which is seated on the annular shoulder 26 of the casing hanger. The upper sealing ring assembly 31 is identical to the lower sealing ring assembly 32 and rests on the top surface of the lantern ring 33 which, in turn, rests on the top surfaces of the sealing ring assembly 32. The lantern ring 33 is of conventional type having annular recesses in its exterior and interior peripheral surfaces and provided with a plurality of inlet openings 94 extending transversely therethrough. In addition, a plurality of longitudinal passageways 95 extend from the top end of the lantern ring to the bottom thereof and communicate with the transverse openings 94.

The packing assembly 10 is held together by a plurality of bolts 95, only two of which are shown in FIG. 1. Each bolt 95 extends through vertically aligned openings 96 in the lubricating packing rings of the sealing ring assembly 31, 32 and a vertical passageway 97 of the lantern ring 33. The bottom of the retainer ring 35 is provided with an annular groove 98 and vertical openings 99 extending from the groove and aligned with the vertical openings through the lubricating packing rings 34. The groove accommodates the heads of the bolts 95 which seat against the shoulder provided by the central wall of the groove 98 when the packing assembly 10 is bolted together. The ends of the bolts 95 are threaded into threaded bores in the bottom side of the upper retainer ring 36.

In order to activate the packing assembly 10 and seal the annulus between the casing hanger 12 and the casing head 14, an axial load is mechanically applied to the packing assembly 10. The load is applied by means of a plurality of holddown screws 100 which are threaded through lateral openings provided in the flange 22 at the top of the casing head 14 and are angularly spaced about the circumference thereof. The holddown screws 100 are formed with generally conical tips 101 and are of sufficient length to extend into the central bore of the casing head where they engage the bottom upward facing wall 102 of an annular groove which is formed circumferentially about the exterior of the upper retainer ring and adapter 36. As the holddown screws 100 enter the bore of the casing head, their conical tips 101 engage the tapered groove wall 102 and cam the retainer ring 36 downwardly. By suitably dimensioning the size of the bolts 100 and the groove in the retainer ring 36, as much as one million pounds force may be applied in the axial direction of the packing assembly 10.

When such an axial force is applied, the packing assembly 10 is compressed and the sealing ring assemblies 31 and 32 radially expand to seal against the cylindrical walls of the casing hanger and the casing head. The configuration of the sealing ring assembly 32 after an axial load is applied is illustrated in FIG. 3. It will be seen from FIG. 3, that the lubricating packing ring 34 is axially compressed and expanded radially outward to form lubricating seals with the casing hanger and casing head. At the same time, the inner metal seal rings 69 and 70 are cammed radially inward by the interaction of their respective camming surfaces, such as exemplified by the camming action on the upper inner metal seal ring 69 applied by the camming surfaces 41 and 72. The radial forces applied to the metal seal rings 69 and 70 are concentrated in their sealing surfaces 81, 82, respectively and thus effect very tight metal-to-metal seals.

In similar fashion, the axial compression of the sealing ring assembly 32 urges the outer metal seal rings 83, 84 in the radially outward direction to establish tight metal-to-metal seals with the inner wall of the casing head. The lubricating packing ring 34 is also axially compressed and expanded radially outward to establish a lubricating packing seal with the casing head, and radially inward to seal against the hanger 12.

It is to be understood that the upper sealing ring assembly 31 is identical to the lower sealing ring assembly 32 and the axial compression of the packing assembly 10 activates the upper sealing ring assembly 31 in the same manner as the lower sealing ring assembly 32.

For emergency purposes, in the event of a seal leak, an injectible sealing fluid can be injected into the packing assembly through a port 110 provided in the wall of the casing head adjacent the lantern ring 33. A removable plug 111 is normally installed in the threaded port 110 but can be replaced with a suitable fitting for accommodating a means for injecting a pressurized sealant fluid or plastic material into the annulus about the lantern ring and the passageway thereof to thereby enhance the seals between the sealing ring assemblies and the walls of the casing hanger and casing head. A suitable injectible material for this purpose is W-K-M No. 109 TFE/Asbestos, a product of the W-K-M Division of ACF Industries, Incorporated. This is a flexible, plastic material which consists of a chemical and solvent resistant acid, Teflon, binders, wood chips and a friction-reducing aggregate.

Figure 4:
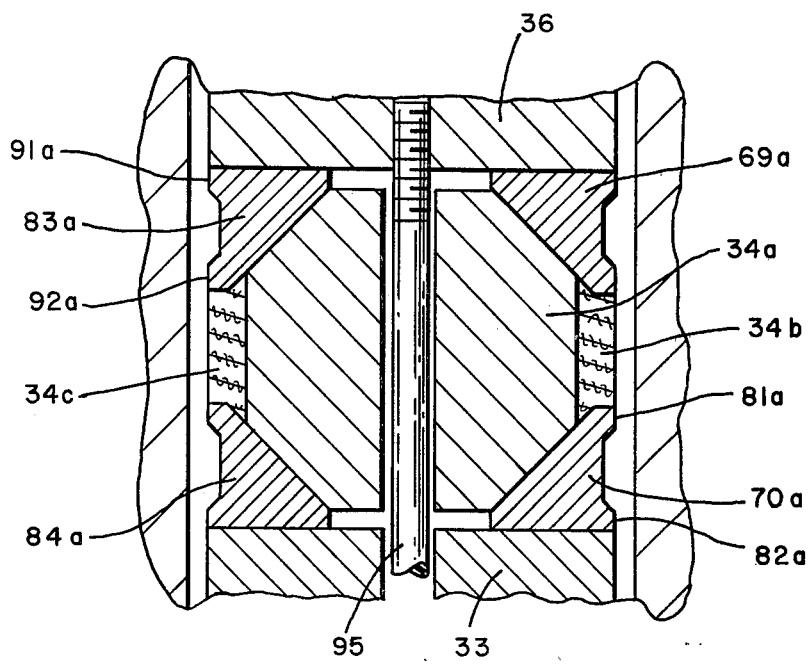
FIG. 4 is a fragmentary sectional view of an upper sealing ring assembly in a modified form of the invention, with the sealing ring assembly being shown in its unloaded state.
Figure 5:
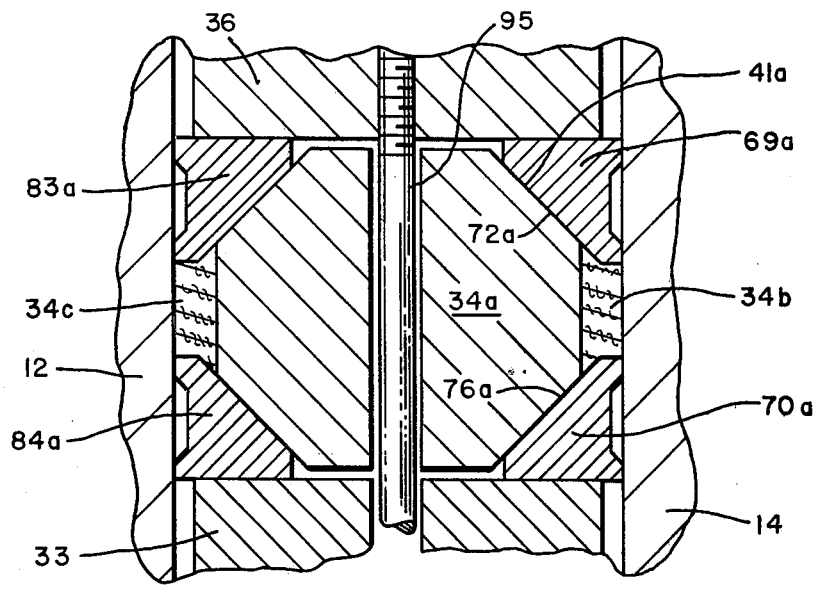
FIG. 5 is a view similar to FIG. 4 but showing the condition of the sealing ring assembly of FIG. 4 after an axial load has been applied thereto.

A modified form of the packing assembly of this invention is illustrated in FIGS. 4 and 5. In this modified form, the packing assembly is substantially identical to the packing assembly 10 of FIGS. 2 and 3 except that the central lubricating ring in each sealing ring assembly is fabricated in three parts with a central metal camming ring 34a, an internal lubricating packing ring 34b and an external lubricating packing ring 34c. When assembled the three parts represent a ring which has the same configuration as the lubricating packing ring 34 in the packing assembly of FIG. 2. An upper sealing ring assembly 31a is illustrated in FIGS. 4 and 5 with the parts thereof corresponding to the parts of the sealing ring assemblies of FIG. 2 having similar numbers.

When the packing assembly is placed under axial compression, as shown in FIG. 5, the inner metal seal rings 69a, 70a of the sealing ring assemblies are cammed radially inward and the outer metal seal rings 83a and 84a are cammed radially outward in the same manner as demonstrated for the sealing ring assemblies in the packing assembly 10 of FIG. 2. In addition, the two lubricating packing rings 34b, 34c are compressed and expanded radially by their interacting camming surfaces in the same manner as the lubricating ring 34 of FIG. 3 to thereby establish lubricating packing seals with the casing hanger and casing head, respectively.

In this second embodiment, the degree of compaction of the packing assembly is greater controlled. For instance, the metal seal rings move downwardly and outwardly but only along the direction of slope of their camming surfaces and the coacting camming surfaces of the camming ring 34a. In the packing assembly 10 of FIGS. 2 and 3, there is some increased compaction and densification of the graphite material in the lubricating packing ring 34 which displaces the camming surfaces of the ring 34 in the downward direction and the metal seal rings are subjected to a complex movement which does not occur in this second embodiment. Accordingly, the vertical shrinkage or vertical dimension of the sealing ring assemblies in the modification illustrated in FIGS. 4 and 5 can be precisely determined, and this can be advantageous when there are restrictions in the degree of camming action to be applied by the holddown screws 100 on the upper retainer ring 36.

Figure 6:
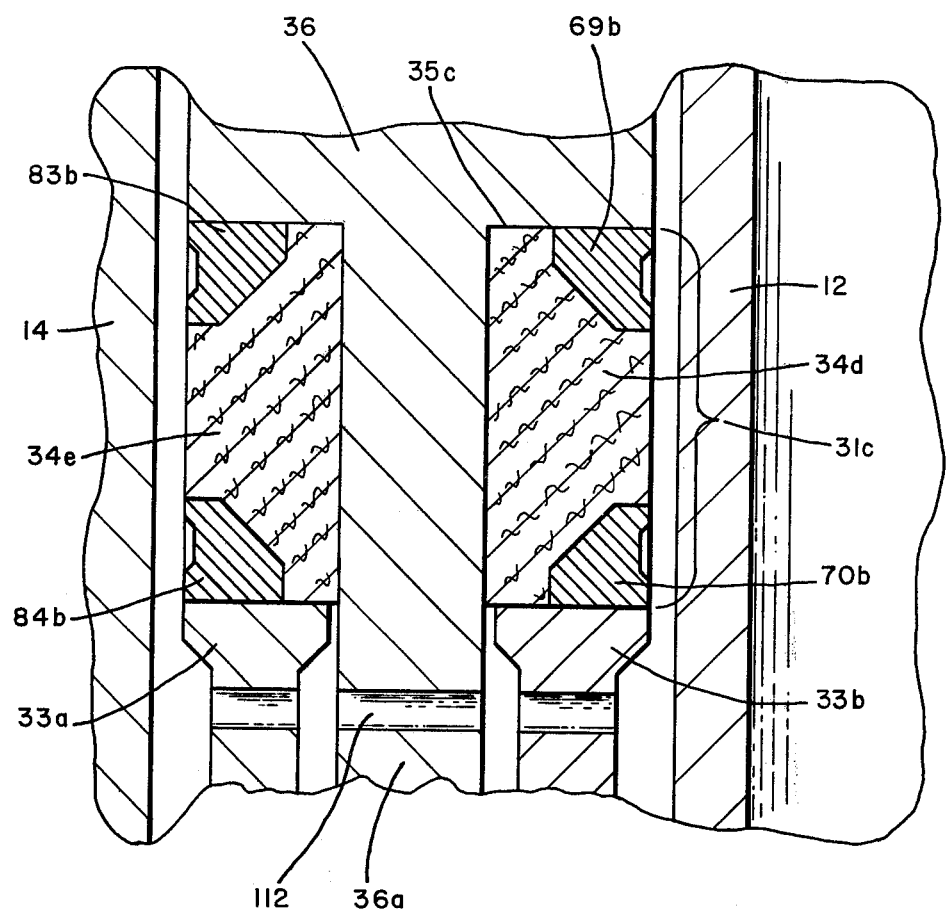
FIG. 6 is a fragmentary section of an upper sealing ring assembly in a further modified form of the invention.

A third embodiment of the invention is shown in FIG. 6. In this embodiment, the central lubricating packing ring in both the upper and lower sealing ring assemblies is fabricated in two parts 34d and 34e which are separated by a downwardly extending cylindrical extension 36a of the upper retainer ring 36. In addition, two lantern rings 33a and 33b are separated by the cylindrical extension 36a which is also provided with a transverse aperture 112 therethrough to establish fluid communication between the two lantern rings. In this third embodiment of the packing assembly of this invention, the assembly is clamped together by bolts (not shown) which extend from the bottom retainer ring 35 to threaded bores in the bottom of the cylindrical extension 36a. The metal seal rings 69b, 70b, 83b and 84b are identical to the metal seal rings of the packing assemblies shown in FIGS. 2 and 4.

The principle of operation of this embodiment is identical to that for the packing assemblies illustrated in FIGS. 2 and 4. However, in this third modification, the axial compression forces applied to the sealing ring assemblies act on smaller areas as represented by the smaller top surface 35c of the sealing ring assembly 31c. Accordingly, the axial compressive force applied by the upper retainer ring 36 is, in effect, multiplied and would be comparably greater than that applied to the sealing ring assemblies in the embodiments of the invention illustrated in FIGS. 3 and 5.

It will therefore be seen that a new packing assembly for a wellhead is disclosed herein which is fire-resistant and is suitable for operation in high temperature and high pressure conditions since the only materials used in its fabrication are metal and graphite. It is also activated and energized by the mechanical application of an axial load which can be carefully controlled and whereby its sealing capabilities are independent of fluid pressures such as varying well pressures. In addition to metal-to-metal seals and lubricating seals, the assembly includes provision of a lantern ring for emergency sealing by the injection of an injectible pressurized sealant fluid. While the packing assembly has been particularly illustrated in the application of sealing between a casing head and casing hanger, it could easily be applied to sealing between other wellhead components such as a tubing hanger and tubing head or in many other applications.

The foregoing description of the invention has been presented for purposes of illustration and explanation and is not intended to be exhaustive or to limit the invention to the precise form disclosed. It was chosen and described in order to best explain the principles of the invention and their practical application to enable others skilled in the art to best utilize the invention in various embodiments and with various modifications as are suited to the particular use contemplated. For example, the packing assembly can be adapted for use as a valve stem packing wherein the axial load can be applied by any of a variety of well known means, such as an outside packing gland.

It is intended that the scope of the invention be defined by the claims appended hereto.

What is claimed is:

1. A packing assembly for sealing an annulus between spaced inner and outer cylindrical surfaces arranged in concentric relationship, said packing assembly being mounted in said annulus and comprising:
   a lubricating packing ring having inner and outer diameters conforming closely to the diameters of said inner and outer cylindrical surfaces whereby said packing ring is in contiguous relation to said cylindrical surfaces, said lubricating packing ring having internal upper and lower annular grooves formed in the internal peripheral surface thereof and external upper and lower annular grooves formed in the outer annular peripheral surface thereof;
   a first pair of inner metal seal rings seated in said internal upper and lower annular grooves of the lubricating packing ring, each of said inner metal seal rings being provided with an annular groove in its inner peripheral surface to form upper and lower annular land surfaces adapted to seal with said inner cylindrical surface;
   a second pair of outer metal seal rings seated in said external upper and lower annular grooves of the lubricating packing ring, each of said outer metal seal rings being provided with an annular groove in its external peripheral surface to form upper and lower annular land surfaces adapted to seal with said outer cylindrical surface;
   said upper annular grooves in the lubricating packing ring having a central bottom surface defining an upward facing frusto-conical camming surface;
   said lower annular grooves in the lubricating packing ring having a central surface defining a downward facing frusto-conical camming surface, and each of said metal rings seated in said annular grooves being provided with frusto-conical surfaces in conforming configuration and in camming engagement with the frusto-conical surface of the packing ring groove in which it is seated;
   retainer means disposed atop and below said seal and packing rings for maintaining said rings in concentric operational orientation; and
   means for effecting an axial compression of said packing assembly whereby the compression and radial expansion of said lubricating packing ring is effected to place said lubricating packing ring in sealing engagement with the inner and cylindrical surfaces defining said annulus and said camming surfaces of said metal seal rings and lubricating packing ring interact to cam said inner metal rings inwards and said outer metal rings radially outwards to achieve sealing relationship with inner and outer cylindrical surfaces which define the annulus.

2. In a wellhead assembly, the combination of a casing head having a bore therethrough defining an inner cylindrical surface;
   a casing hanger supported within said casing head in concentric relation therewith, said casing hanger having an outer cylindrical surface spaced from the inner cylindrical surface of the casing head to define an annular space therebetween and including an external upward facing annular shoulder provided by an enlarged diameter portion of said casing hanger;
   a packing assembly mounted within said annular space and supported on said annular shoulder, said packing assembly comprising an upper sealing ring assembly, a lower sealing ring assembly and a rigid spacer ring disposed intermediate said upper and lower sealing ring assemblies in stacked concentric relation therewith, each said sealing ring assembly comprising a lubricating packing ring having outer and inner diameters conforming closely to the inner diameter of said casing head and the outer diameter of said casing hanger, respectively, whereby said packing ring is in contiguous relation to said cylindrical surfaces defining said annulus, said lubricating packing ring having internal upper and lower annular grooves formed in the internal peripheral surface thereof and external upper and lower annular grooves formed in the external peripheral surface thereof;
   a first pair of inner metal seal rings seated in said internal upper and lower annular grooves of the lubricating packing ring, each said inner metal seal ring having inner peripheral sealing surfaces disposed closely about the outer cylindrical surface of said casing hanger;
   a second pair of outer metal seal rings seated in said external upper and lower grooves of said lubricating packing ring, each said outer metal seal ring having outer peripheral sealing surfaces disposed closely adjacent the inner cylindrical surface of said casing head;
   cooperative camming means on said graphite lubricating ring and each of said metal sealing rings for effecting an outward radial expansion of said outer metal seal rings and an inward radial expansion of said inner metal seal rings when said packing assembly is subjected to an axial compression;
   an upper metal retainer ring disposed atop said upper sealing ring assembly in stacked concentric relation therewith;

a bottom metal retainer ring seated on said annular shoulder and disposed against the bottom of said lower sealing ring assembly; and compression means for placing said packing assembly in axial compression whereby said inner metal seal rings are cammed radially inward and the outer metal seal rings are cammed radially outward to effect metal-to-metal seals with said cylindrical surfaces defining said annulus and said lubricating packing ring is radially expanded to effect a tight lubricating seal with the cylindrical surfaces defining said annulus.

3. In a wellhead assembly as set forth in claim 2 wherein said compression means comprises a groove in the external circumferential wall of said top retainer ring, said groove having an upward facing lower side wall defining a frusto-conical surface, a plurality of holddown screws extending through the wall of said casing head and adapted to engage said upward facing lower groove wall and urge said top retainer ring downwardly to thereby effect an axial compression of said packing assembly.

4. In a wellhead assembly as described in claim 2 wherein said spacer ring is a lantern ring having in its outer circumference an inlet opening connecting with passageways therethrough and providing direct fluid access to each side thereof and said casing head is provided with an aperture extending from the exterior thereof to said annulus and located adjacent said lantern ring whereby means may be applied to said aperture for supplying a sealing fluid under pressure to said inlet opening.

5. In a wellhead assembly as set forth in claim 2 wherein each of said inner metal rings is provided with an annular groove in its inner peripheral surface to form upper and lower annular landed areas adapted to form sealing surfaces with the outer cylindrical surface of the casing hanger and each of said metal rings is provided with an annular groove in its external peripheral surface to form upper and lower annular landed areas adapted to form sealing surfaces with the inner cylindrical surface of the casing head.

6. In a wellhead assembly as set forth in claim 2 wherein said lubricating packing ring is graphite material.

7. A packing assembly for sealing an annulus between spaced inner and outer cylindrical surfaces of a pair of outer and inner metallic cylindrical members disposed in concentric relationship and wherein one of said cylindrical members is provided with an upward facing annular shoulder extending within said annulus, said packing assembly comprising an upper sealing ring assembly, a lower sealing ring assembly, and a rigid spacer ring disposed intermediate said upper and lower sealing ring assemblies in stacked concentric relation therewith, each said sealing ring assembly comprising:

a lubricating packing ring having outer and inner diameters conforming closely to the inner diameter of said casing head and the outer diameter of said casing hanger, respectively, whereby said packing ring is in contiguous relation to said cylindrical surfaces defining said annulus, said lubricating packing ring having internal upper and lower annular grooves formed in the internal peripheral surface thereof and external upper and lower annular grooves formed in the external peripheral surface thereof;

a first pair of inner metal seal rings seated in said internal upper and lower annular grooves of the lubricating packing ring, each said inner metal seal ring having inner peripheral sealing surfaces disposed closely about the outer cylindrical surface of said inner cylindrical member;

a second pair of outer metal seal rings seated in said external upper and lower grooves of said lubricating packing ring, each said outer metal seal ring having outer peripheral sealing surfaces disposed closely adjacent the inner cylindrical surface of said outer cylindrical member;

cooperative camming means on said lubricating ring and each of said metal sealing rings for effecting an outward radial expansion of said outer metal seal rings and an inward radial expansion of said inner metal seal rings when said packing assembly is subjected to an axial compression;

an upper metal retainer ring disposed atop said upper sealing ring assembly in stacked concentric relation therewith;

a bottom metal retainer ring seated on said annular shoulder and disposed against the bottom of said lower sealing ring assembly; and compression means for placing said packing assembly in axial compression whereby said inner metal seal rings are cammed radially inward and the outer metal seal rings are cammed radially outward to effect metal-to-metal seals with said cylindrical surfaces defining said annulus and said lubricating packing ring is radially expanded to effect a tight lubricating seal with the cylindrical surfaces defining said annulus.

8. A packing assembly as described in claim 7 wherein said spacer ring is a lantern ring having in its outer circumference an inlet opening connecting with passageways therethrough and providing direct fluid access to each side thereof and said outer cylindrical member is provided with an aperture extending from the exterior thereof to said annulus and located adjacent said lantern ring whereby means may be applied to said aperture for supplying a sealing fluid under pressure to said inlet opening.

9. A packing assembly as set forth in claim 7 wherein each of said inner metal rings is provided with an annular groove in its inner peripheral surface to form upper and lower annular landed ares adapted to form sealing surfaces with the outer cylindrical surface of said inner cylindrical member and each of said outer metal rings is provided with an annular groove in its external peripheral surface to form upper and lower annular landed areas adapted to form sealing surfaces with the inner cylindrical surface of said outer cylindrical member.

10. A packing assembly as set forth in claim 7 wherein said lubricating packing ring is graphite material.

11. A packing assembly for sealing an annulus between spaced inner and outer cylindrical surfaces of a pair of outer and inner metallic cylindrical members disposed in concentric relationship and wherein one of said cylindrical members is provided with an upward facing annular shoulder extending within said annulus, said packing assembly comprising an upper sealing ring assembly, a lower sealing ring assembly, and a rigid spacer ring disposed intermediate said upper and lower sealing ring assemblies in stacked concentric relation therewith, each said sealing ring assembly comprising:

a camming ring member having a pair of upper and lower camming surfaces on its internal periphery and a pair of upper and lower camming surfaces on its external periphery, said camming ring member including an inner annular lubricating packing surface on its inner periphery and an outer annular lubricating packing surface on its outer periphery, said camming ring having internal upper and lower annular grooves formed in the inner surface thereof and external upper and lower annular grooves in the outer peripheral surface thereof;

a first pair of inner metal seal rings seated in said inner upper and lower annular grooves of the camming ring, each said inner metal seal ring having inner peripheral sealing surfaces disposed closely about the outer cylindrical surface of said inner cylindrical member;

a second pair of outer metal seal rings seated in said external upper and lower grooves of said camming ring, each said outer metal seal ring having outer peripheral sealing surfaces disposed closely adjacent the inner cylindrical surface of said outer cylindrical member;

camming means on said metal sealing rings for interacting with said upper and lower camming surfaces on said camming ring for effecting an outward radial expansion of said outer metal seal rings and an inward radial expansion of said inner metal seal rings when said packing assembly is subjected to an axial compression;

an upper metal retainer ring disposed atop said upper sealing ring assembly in stacked concentric relation therewith;

a bottom metal retainer ring seated on said annular shoulder and disposed against the bottom of said lower sealing ring assembly; and compression means for placing said packing assembly in axial compression whereby said inner metal seal rings are cammed radially inward and the outer metal seal rings are cammed radially outward to effect metal-to-metal seals with said cylindrical surfaces defining said annulus and said lubricating packing surface of the camming ring are moved radially to effect a tight lubricating seal with the cylindrical surfaces defining said annulus.

* * * * *